United States Patent
Gutierrez Guzman et al.

(10) Patent No.: US 10,246,023 B2
(45) Date of Patent: Apr. 2, 2019

(54) COLLAPSIBLE MAP POCKET WITH THERMOFORMED POLYETHYLENE/POLYPROPYLENE FIBERS

(71) Applicant: GM GLOBAL TECHNOLOGY OPERATIONS LLC, Detroit, MI (US)

(72) Inventors: Eduardo Gutierrez Guzman, Toluc (MX); Ivan Escutia Figueroa, Barcelona (ES); Fernando Nava Ortiz, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/477,948

(22) Filed: Apr. 3, 2017

(65) Prior Publication Data

US 2018/0281690 A1    Oct. 4, 2018

(51) Int. Cl.
*B60R 7/04*    (2006.01)
*B32B 5/02*    (2006.01)
*B32B 37/06*    (2006.01)
*B32B 37/12*    (2006.01)

(52) U.S. Cl.
CPC ............. *B60R 7/046* (2013.01); *B32B 5/022* (2013.01); *B32B 37/06* (2013.01); *B32B 37/12* (2013.01); *B32B 2605/003* (2013.01)

(58) Field of Classification Search
CPC ......... B60R 7/046; B32B 5/022; B32B 37/06; B32B 37/12; B32B 2605/003
USPC ....................................... 296/37.13
See application file for complete search history.

(56) References Cited

U.S. PATENT DOCUMENTS

| 8,029,041 | B2 * | 10/2011 | Hall | ..................... B60J 5/0451 296/146.6 |
| 2002/0092598 | A1 * | 7/2002 | Jones | ..................... B32B 7/02 156/82 |
| 2007/0267889 | A1 * | 11/2007 | Flendrig | ................ B60J 5/0416 296/146.6 |

\* cited by examiner

*Primary Examiner* — Joseph D. Pape
*Assistant Examiner* — Dana D Ivey
(74) *Attorney, Agent, or Firm* — Lorenz & Kopf, LLP

(57) ABSTRACT

A map pocket usable as a trim component for a vehicle door assembly includes an inward-facing, substrate material layer including a polyethylene/polypropylene fibrous, thermoformed material and an outward-facing, A-side material layer including a non-woven, thermoformed material, disposed abuttingly against the substrate material layer.

20 Claims, 9 Drawing Sheets

US 10,246,023 B2

COLLAPSIBLE MAP POCKET WITH THERMOFORMED POLYETHYLENE/POLYPROPYLENE FIBERS

INTRODUCTION

The present disclosure generally relates to vehicle storage compartments, which may be embodied as a pocket, such as a map pocket. More particularly, the present disclosure relates to a collapsible map pocket that is made from thermoformed fibers, such as polyethylene and polypropylene fibers, positioned in a vehicle, for example as part of a door trim assembly.

The interior trim appearance of an automobile has been a key area of marketing focus. Interior trim components are often given treatments which provide increases in perceived value as well as brand differentiation. The current automotive interior styling trend is toward a softer, wrap-around styling vision which places special emphasis on the tactile feel of the interior, as well as the visual impression. The surface of the trim panel which is exposed to the passenger is referred to as an A-side layer. Typical materials for the A-side layer are flocking, leather, vinyl or textile materials, including cloth or carpet. While the materials used as A-side layers serve their cosmetic purposes well, none of them by themselves will they retain a shape. Accordingly, a trim substrate is provided for the necessary rigidity, and the A-side layer covers the trim substrate.

Side impact events in vehicles have been identified as one of the top priorities for both research and regulation with government requirements continuing to become more stringent. It is known that vehicles may collide with obstacles during operation. Frequently the door structure is subjected to a large intrusion. In an effort to improve the protection of vehicle occupants during a side impact event, automotive vehicles have been provided with various structural upgrades to lessen the effects of a collision type impact on an occupant compartment of the vehicle. Particularly, to lessen the effects of a side collision type impact of the vehicle occupant seating area, a number of approaches have been undertaken. These include providing a collapsible/deformable barrier to absorb the impact energy of the collision, protecting the occupant. Due to its location adjacent to the vehicle occupants, the map pocket trim component has been used as such a collapsible/deformable barrier.

For example, as shown in FIG. 1, a typical map pocket substrate 100 is shaped to include a variety of horizontal surfaces 111, 112, a variety of vertical surfaces 113, 114, and a plurality of attachment points 115 located about a peripheral flange 117 of the map pocket substrate 100. The shape and configuration of the map pocket substrate 100, as to its horizontal and vertical surfaces 111-114, varies considerable from vehicle to vehicle, based on aesthetic and design considerations. With further reference to FIG. 2, an A-side material 120 is the provided and attached to the map pocket substrate 100. As shown, the A-side material 120 is generally shaped to correspond with the shape of the substrate 100. That is, the A-side material 120 shape includes horizontal surfaces 121, 122 and vertical surfaces 123, 124 that broadly correspond with horizontal surfaces 111, 112 and vertical surfaces 113, 114 of the substrate 100.

The map pocket substrate 100 is typically made from a material that is susceptible to injection molding. These materials include, for example, various plastic resins. However, injection-molded plastic resins typically exhibit a hardness and rigidity that exceeds what would be desirable for deformability during a side-impact collision. Thus, map pocket substrate 100 further includes a plurality of cut-outs 116 that are wholly within the periphery of the map pocket trim substrate. As used herein, the term "cut-out" refers to a void within the periphery of the substrate that exceeds 5% of the total surface area of the substrate, and differentiates from the previously-described attachment points 115, which are much smaller. The cut-outs 116 are provided to lessen the structural rigidity of the injection-molded map pocket substrate 100, such that it may achieve an acceptable level of deformability for protecting the occupant of the vehicle during a side-impact collision event.

On drawback of using these cut-outs 116 as a means of achieving acceptable deformability is that the level of deformability is not easily tunable. That is, to achieve greater or lesser levels of deformability, more or fewer cut-outs 116 need to be provided, which means an entirely new mold is required for each tuning level. As will be appreciated, the requirement to produce and maintain multiple molds for each injection-molded map pocket substrate adds considerable design time and expense to the vehicle manufacturing process. Another drawback of using these cut-outs 116 is the presence of "soft spots" on the fully-assembled trim panel (i.e., with the A-side included), in the areas of the cut-outs 116.

Accordingly, it would be desirable to provide map pockets that are tunable with regard to their deformability, without the need for differing numbers or sizes of cut-outs. Additionally, it would be desirable to provide map pockets that have continuous vertical and horizontal surfaces (i.e., excluding cut-outs) onto which to place the A-side material to avoid the presence of soft spots. Furthermore, other desirable features and characteristics of the present disclosure will become apparent from the subsequent detailed description and the appended claims, taken in conjunction with the accompanying drawings and this introductory section.

BRIEF SUMMARY

In one embodiment, disclosed is a map pocket usable as a trim component for a vehicle door assembly includes an inward-facing, substrate material layer including a polyethylene/polypropylene fibrous, thermoformed material and an outward-facing, A-side material layer including a non-woven, thermoformed material, disposed abuttingly against the substrate material layer with adhesive.

In another embodiment, disclosed is a vehicle including at least one door assembly. The at least one door assembly includes a plurality of trim components. At least one of the plurality of trim components includes a map pocket. Further, the map pocket includes an inward-facing, substrate material layer including a polyethylene/polypropylene fibrous, thermoformed material and an outward-facing, A-side material layer including a non-woven, thermoformed material, disposed abuttingly against the substrate material layer with adhesive.

In yet another embodiment, disclosed is a method for manufacturing a map pocket usable as a trim component for a vehicle that includes the steps of providing or obtaining a substrate material layer including a polyethylene/polypropylene fibrous, thermoformable material, providing or obtaining an A-side material layer including a non-woven, thermoformable material, disposing the substrate material layer adjacent to the A-side material layer in a thermoforming mold with adhesive, and thermoforming the substrate material layer with the A-side material layer to form the map pocket as a unitary, bi-layer structure.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed collapsible map pockets. Furthermore, there is no intention to be bound by any theory presented in the preceding introductory section or the following detailed description.

Motor vehicle passenger doors commonly include a storage pocket. The storage pocket may be used by an occupant for the convenient storage of maps and other small items. Such a pocket is often referred to as a "map pocket". Objects are introduced into a map pocket through an open upper end. The shape and configuration of the map pocket is highly variable, and is dependent on the particular design and aesthetic considerations for the vehicle for which the map pocket is designed. As initially noted above, due to its position along the passenger doors of the motor vehicle, the map pocket structure plays a role in protecting the passengers during side-impact collision events. That is, the map pocket structure forms part of the barrier between passenger and side-impacting object.

Figure 3:
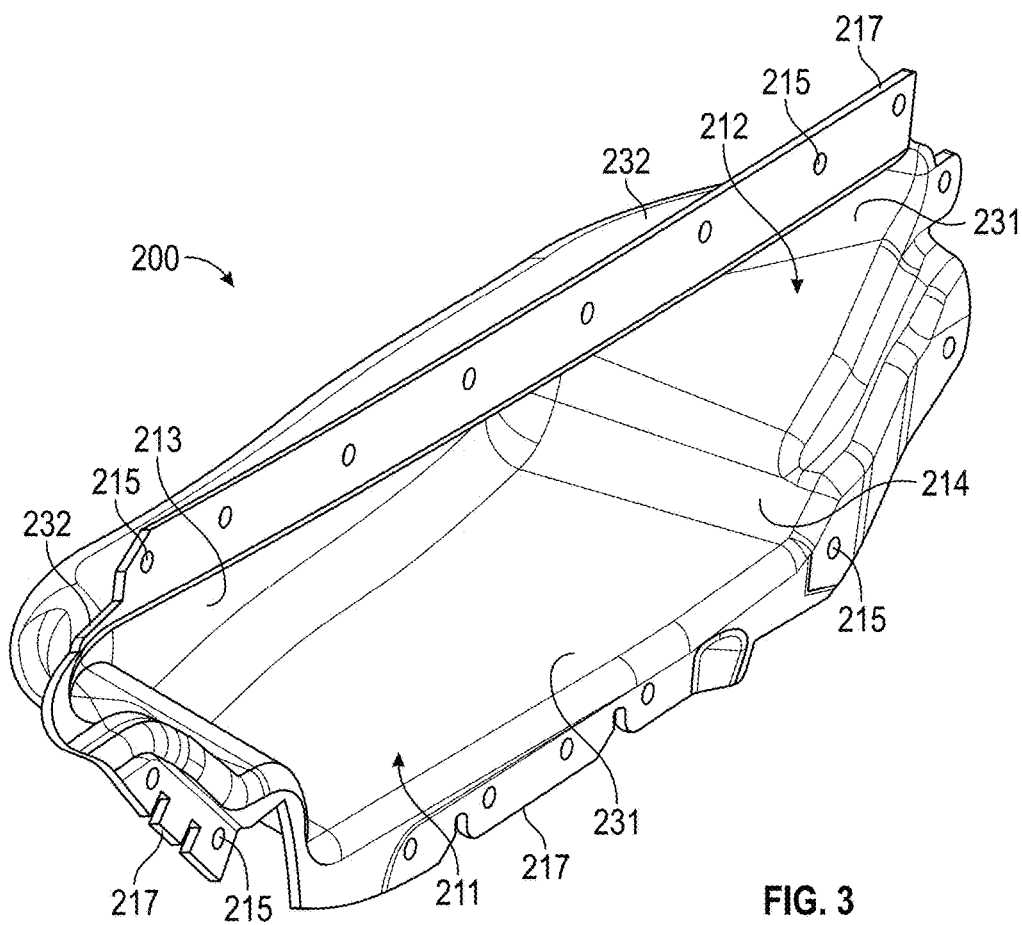
FIG. 3 illustrates a collapsible map pocket that is made from thermoformed fibers, such as polyethylene and polypropylene fibers, that forms part of a door trim assembly of a vehicle in accordance with embodiments of the present disclosure.

For illustrative purposes, one exemplary map pocket 200 in accordance with the present disclosure is provided in FIG. 3. In the illustrated embodiment, the map pocket 200 includes a plurality of substantially horizontally-oriented surfaces 211, 212 and a plurality of substantially vertically-oriented surfaces 213, 214. As used herein, the term horizontal generally refers to the plane of the ground over which the vehicle travels, and the term vertical generally refers to a plane perpendicular to the horizontal plane. The term substantially means that the surfaces may vary from their respective plane by up to 30 degrees. Furthermore, some surfaces may be curved, in the sense that they are neither fully horizontal or vertical. Moreover, other surfaces may be angled inwardly, outwardly, upwardly, or downwardly from horizontal or vertical. As noted above, the location of placement of the surfaces 211-214 generally creates a pocket shape with at least one open end, with the various surfaces 211-214 be provided for the securement of objects, such as maps.

For purposes of securing the map pocket to the rest of the door trim assembly, a peripheral flange 217 is provided about some or all of the periphery of the map pocket 200. The peripheral flange 217 includes a plurality of attachment points 215, which are provided as small apertures in the flange 217 through which an appropriate fastening device may be deployed, such as stakes or the like, in order to secure the map pocket 200 to the rest of the door trim assembly. The shape of the flange 217, and the number and positioning of the attachment points 215, is also dependent on the shape and design of the vehicle door in question.

In an embodiment, the map pocket 200 includes an outer, A-side surface material 231 and an inner substrate material 232. As used herein, the outer, A-side is the side of the map pocket 200 that faces the passengers of the vehicle (i.e., facing the vehicle interior) and the inner side refers to the side that abuts the rest of the vehicle door assembly. The outer, A-side surface material 231 may include a non-woven material that is selected for both aesthetic and comfort considerations. Furthermore, the outer, A-side surface material should be one that is susceptible to thermoforming, which is the process used to manufacture the presently-described map pockets, as will be discussed in greater detail below. One particular example of a non-woven, thermoformable material is "Troubador", which is available from a variety of suppliers in various colors, textures, and densities. The thickness of the nonwoven, thermoformable A-side material 231 may vary, but is generally from about 0.5 to about 50 millimeters in thickness.

In an embodiment, the inner substrate material 232 may include a polyethylene (PE)/polypropylene (PP) non-woven, fibrous material. The phrase "non-woven fibrous material" as used herein refer to any material including two or more fibers that are neither woven nor knitted, that is to say fibers that have been blended and laid into a matted form with the fibers randomly oriented in the mat. The fibrous material can exist in two forms: a flexible mat and a more rigid form that is produced by thermoforming. The non-woven fibrous material includes a blending of two or more types of thermoplastic polymer fibers. The term "thermoplastic polymer fiber" as used herein, refers to any fiber including a polymer which is easily formed at higher temperatures because its viscosity decreases monotonically with increasing temperature, and rapidly above the melt temperature. For purposes of this disclosure, thermoplastic polymers include, but are not limited to, polypropylene (PP) and polyethylene (PE).

The ratios of fibers that are given in this disclosure are in weight fractions. Therefore a ratio of 50:50 of Fiber A to Fiber B in a mixture would indicate that 50% of the total mass in the mixture consists of Fiber A, and 50% of the total mass in the mixture consists of Fiber B. The range of weight ratios in this disclosure go from 20:80 to 80:20 PP fiber to PE fiber. The ratio of the fibers affects the density of the non-woven, fibrous material. Moreover, other factors may also affect its density, such as the manner of blending the fibers. Thus, it should be appreciated that PE/PP fiber mats are available at various densities. Typical densities of the non-woven, fibrous material suitable for use as substrate material layer 232 are from about 500 grams per square meter (gsm) to about 2000 grams per square meter.

Figure 1:
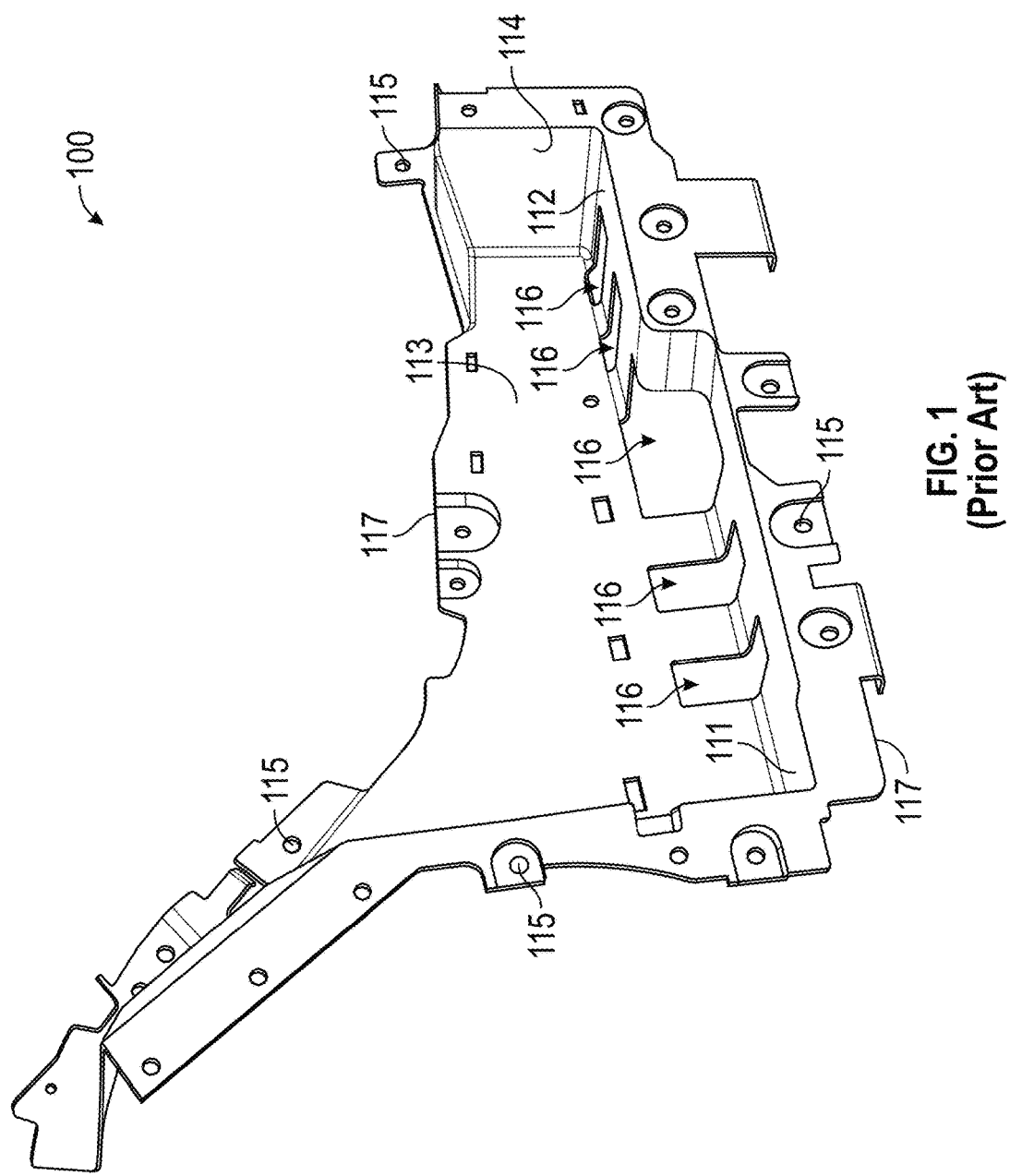
FIG. 1 illustrates a rigid, injection-molded map pocket trim substrate with cut-out features.
Figure 2:
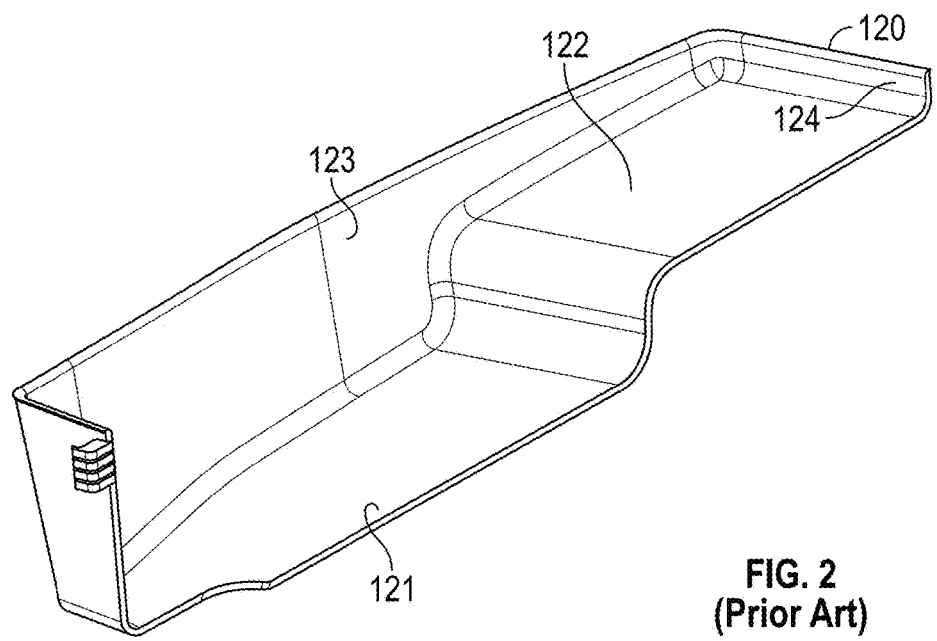
FIG. 2 illustrates an A-side material layer that is shaped for placement along the rigid substrate of FIG. 1.

As noted initially above, the non-woven, fibrous material 232 is susceptible to thermoforming, which makes the material more rigid and allows it to retain its shape. However, the material retains its fibrous quality even after thermoforming, and thus is still less rigid than the example of an injected-molded resin given above in connection with FIG. 1. Thus, upon thermoforming, the fibrous, non-woven PE/PP material is able to serve as the substrate 232 for the map pocket 200, and provide enough rigidity for this purposes. Moreover, because this material is available in a wide range of densities, the ultimate rigidity of the map pocket substrate 232 is highly tunable based on material selection alone, as opposed to the need for design changes (i.e., the introduction of cut-outs) as discussed above with regard to FIG. 1. The thickness of the map pocket substrate material 232, upon thermoforming, may generally range from about 3 millimeters to about 15 millimeters, and in some instances may be greater than about 15 millimeters.

As such, in an embodiment, the map pocket 200 does not include any cut-outs from any of the horizontal or vertical surfaces 211-214 with regard to the substrate material layer 232 (as opposed to the design discussed above with regard to FIG. 1). Again, as used herein, the term "cut-out" refers to a void within the periphery of the substrate that exceeds 5% of the total surface area of the substrate, and differentiates from the previously-described attachment points 215, which are much smaller, and further differentiates from any discontinuities of the flange 217 (which would not be "within" the periphery of the substrate). Rather, the surfaces 211-214 form a continuous surfaces, without voids, with respect to the PE/PP fibrous material layer 232.

Figure 5B:
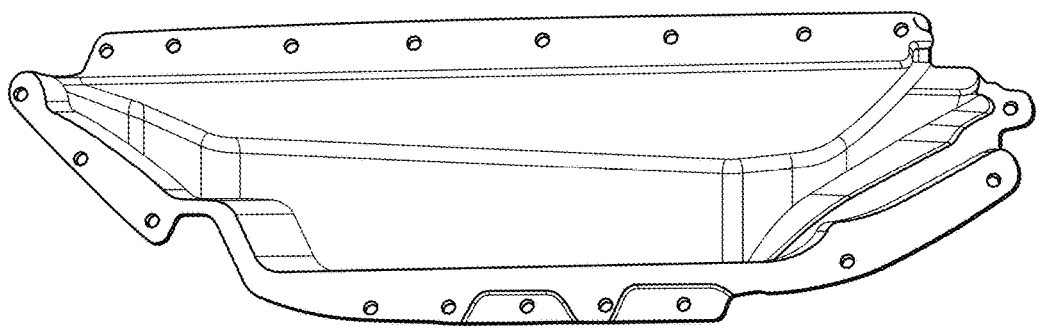
FIG. 5B is a line drawing thereof.
Figure 5A:
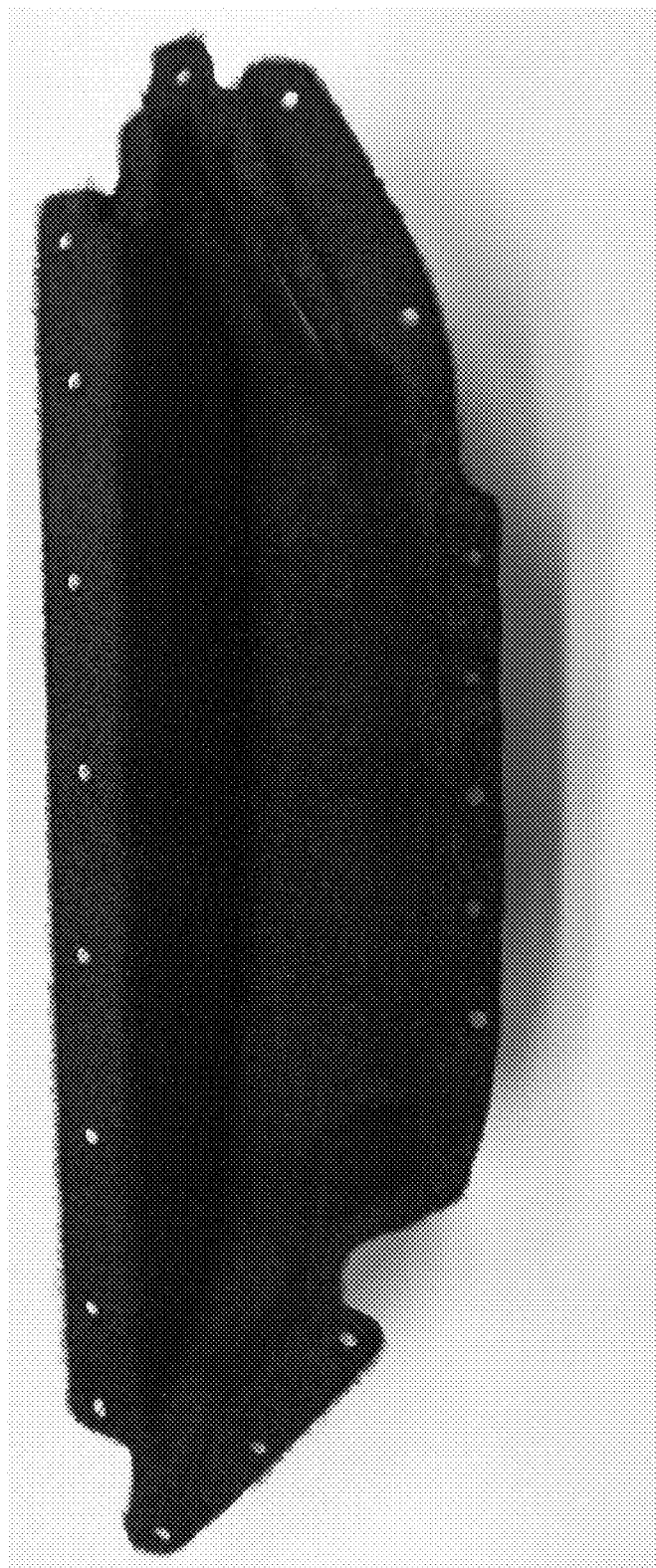
FIG. 5A is a photograph of an A-side portion of a collapsible map pocket in accordance with one particular embodiment of the present disclosure.
Figure 6A:
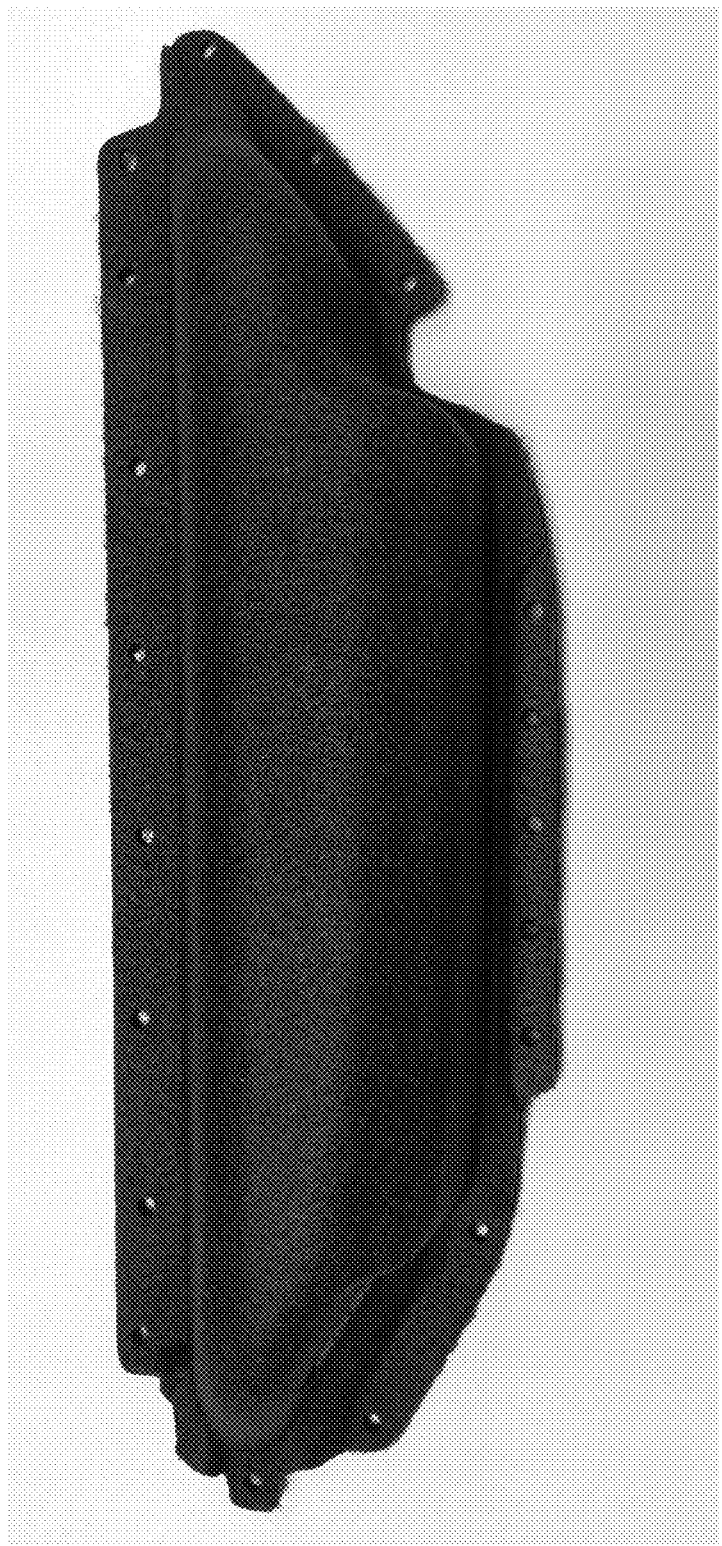
FIG. 6A is a photograph of a polyethylene/polypropylene substrate portion of a collapsible map pocket in accordance with one particular embodiment of the present disclosure.
Figure 6B:
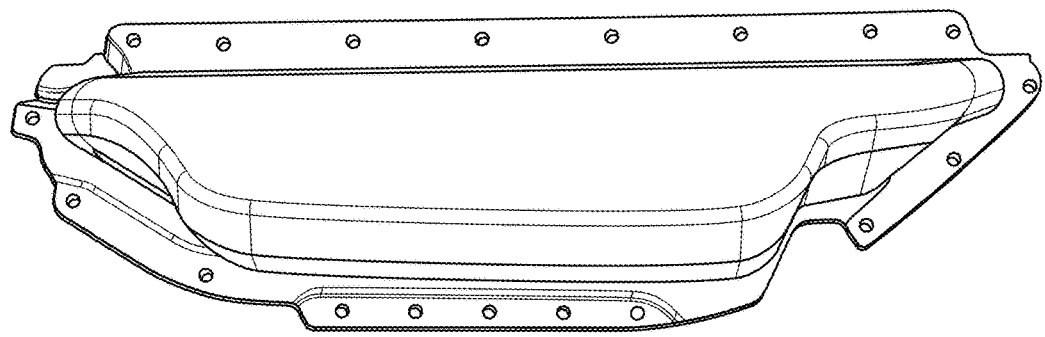
FIG. 6B is a line drawing thereof.
Figure 7B:
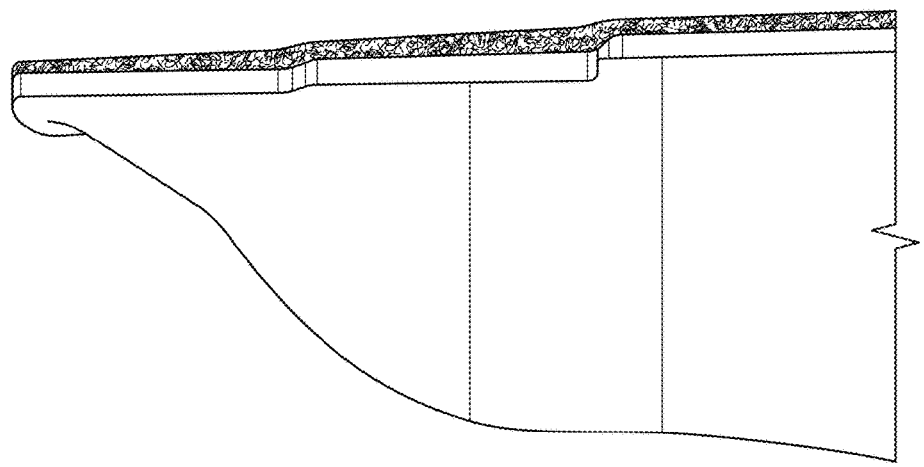
FIG. 7B is a line drawing thereof.
Figure 7A:
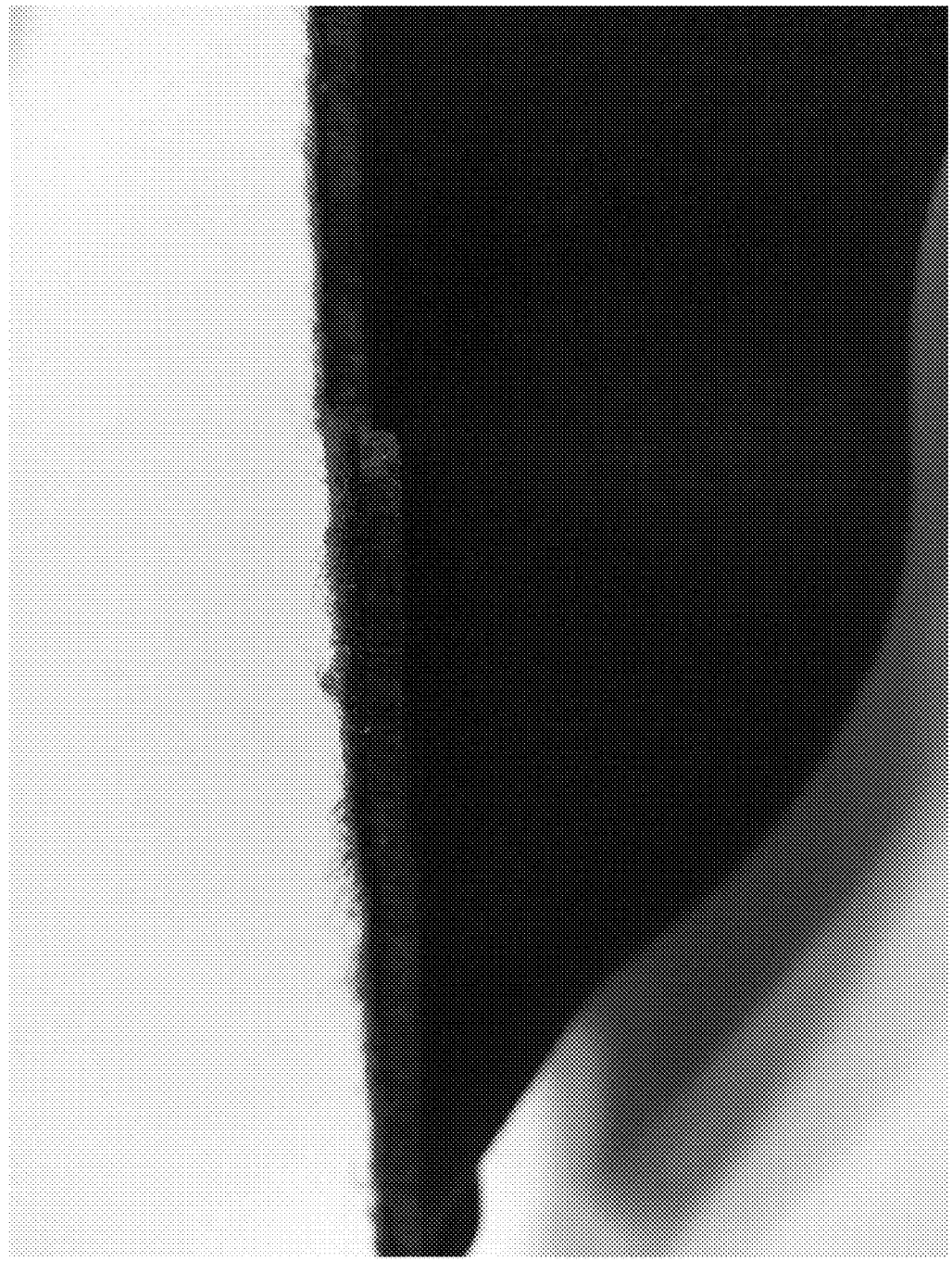
FIG. 7A is a close-up photograph of a flange of the substrate portion and A-side portion of a collapsible map pocket in accordance with one particular embodiment of the present disclosure.
Figure 8A:
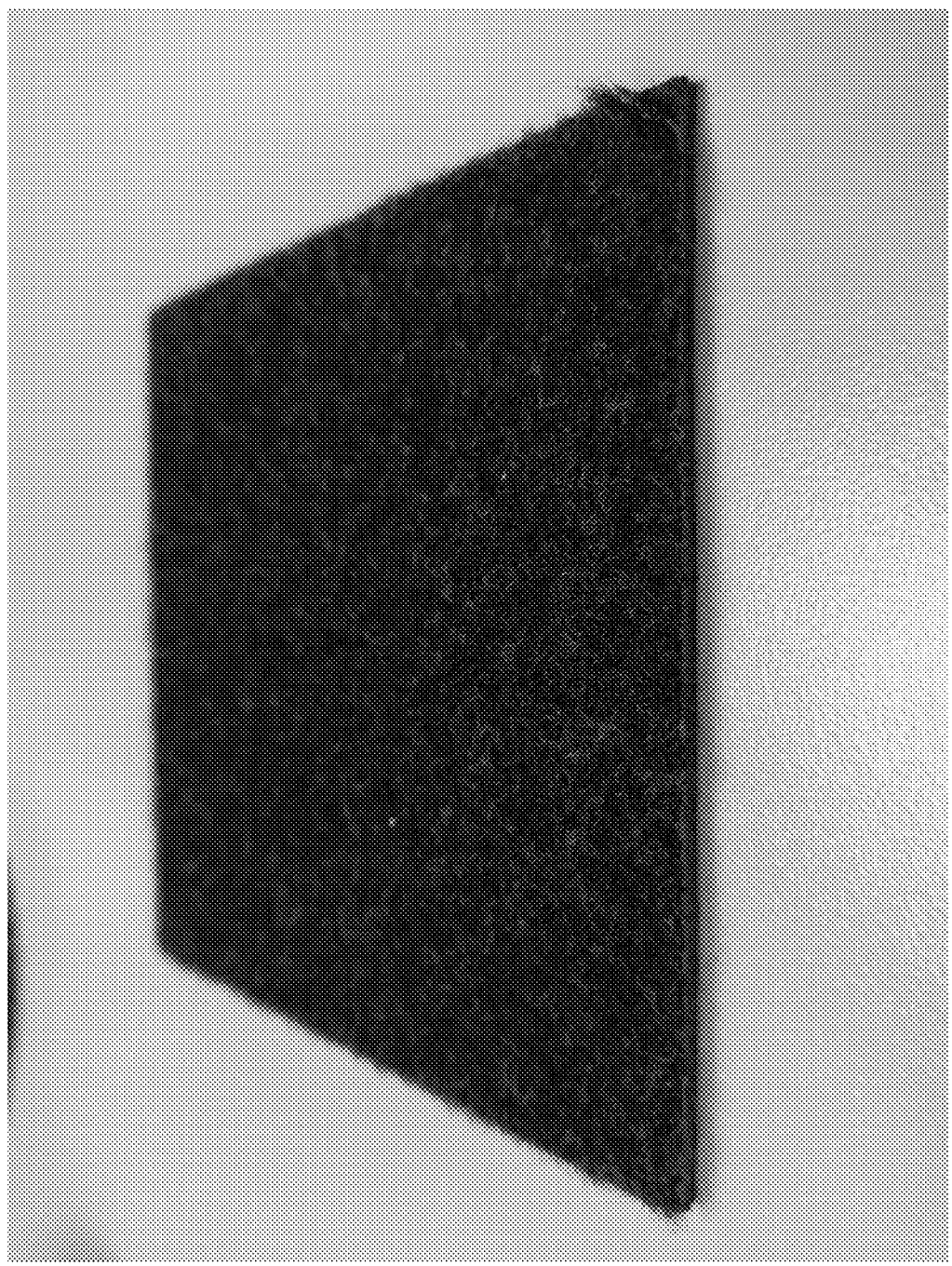
FIG. 8A is a photograph showing the A-side portion adhered (i.e., with adhesive) to the substrate portion (note that the lower right edge corner is upturned to show the distinction between layers) in accordance with one particular embodiment of the present disclosure.
Figure 8B:
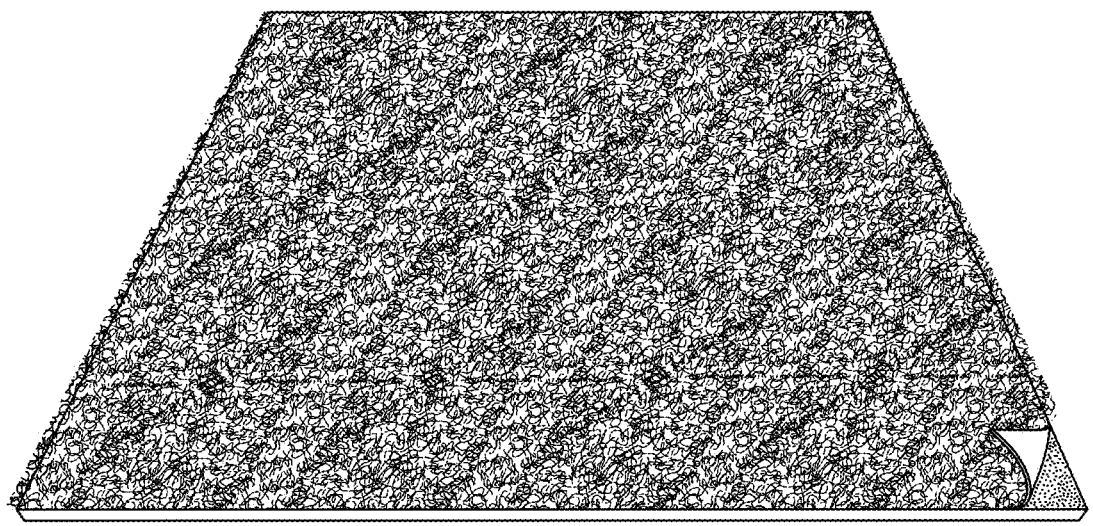
FIG. 8B is a line drawing thereof.

In accordance with the foregoing, and for purposes of better illustration, FIG. 5A is a photograph of an A-side portion of a collapsible map pocket in accordance with one particular embodiment of the present disclosure, and FIG. 5B is a line drawing thereof; FIG. 6A is a photograph of a polyethylene/polypropylene substrate portion of a collapsible map pocket in accordance with one particular embodiment of the present disclosure, and FIG. 6B is a line drawing thereof; FIG. 7A is a close-up photograph of a flange of the substrate portion and A-side portion of a collapsible map pocket in accordance with one particular embodiment of the present disclosure, and FIG. 7B is a line drawing thereof; and FIG. 8A is a photograph showing the A-side portion adhered (i.e., with adhesive) to the substrate portion in accordance with one particular embodiment of the present disclosure, and FIG. 8B is a line drawing thereof.

Figure 4:
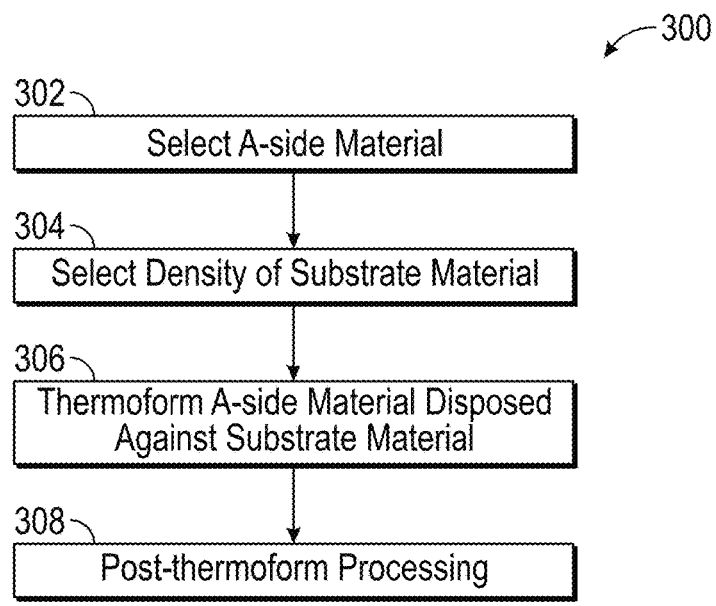
FIG. 4 is a flowchart illustrating a method for manufacturing the collapsible map pocket illustrated in FIG. 3.

Turning now to the flowchart provided in FIG. 4, one exemplary method 300 for manufacturing a map pocket 200, using thermoforming, is discussed. First, an appropriate A-side material is selected at step 302. Again, the A-side material is selected from a non-woven, thermoformable material, such as "Troubador". The considerations for the A-side material selection are primarily aesthetics and feel, as this side is exposed to the vehicle passengers. Next, at step 304, the PP/PE fibrous material is selected for a density suitable to the particular application. As noted above, this material is tunable in the sense that various levels of deformability can be achieved using material selection along, without changing the design or configuration of the map pocket. Again, the level of deformability relates directly to the side-impact resistance characteristics of the door panel. In other embodiments, the material is not necessarily a PP/PE material, yet still may be choses for a density suitable to the particular application.

Next, at step 306, the A-side material and the substrate material are brought together, adjacent to one another, and glued together with adhesive and thermoformed. As known in the art, thermoforming is a manufacturing process where one or more sheets of material are heated to a pliable forming temperature, and formed to a specific shape in a mold. The process of thermoforming also serves to adhere the substrate layer and the A-side layer together into a unitary, bi-layer structure, as shown in FIG. 3, in addition to the function of the adhesive. Finally, at step 308, the thermoformed structure is subjected to post-thermoform processing, such as trimming, to contour the edges and form the attachment points, resulting in the final configuration shown fully in FIG. 3 (including the shaped flange 217 and attachment points 215). Conventional processing methods thereafter may be used to attach the completed map pocket to the door trim panels, using stakes for example, and to complete the assembly of the vehicle door, and ultimately entire vehicle. These conventional processing methods are well-known to those having ordinary skill in the art, and are omitted herein for brevity.

Accordingly, the present disclosure has provided embodiments of tunably-deformable/collapsible maps pockets for use in vehicles, particular vehicle door assemblies. The completed map pocket is referred to herein as either "collapsible" or "deformable" due to the fact that its fibrous material substrate will collapse or deform with the application of a force, such as may be encountered during a side-impact collision. In this regard, the present disclosure has provided provide map pockets that are tunable with regard to their deformability, without the need for differing numbers or sizes of cut-outs (116). As such, the disclosed map pockets have continuous vertical and horizontal surfaces (i.e., excluding cut-outs) onto which to place the A-side material to avoid the presence of soft spots. The disclosed map pockets thus provide increased safety to the vehicle, while at the same time maintaining pleasing interior vehicle aesthetics.

While at least one exemplary collapsible map pocket has been presented in the foregoing detailed description, it should be appreciated that a vast number of variations exist. It should also be appreciated that the exemplary collapsible map pocket or exemplary collapsible map pockets are only examples, and are not intended to limit the scope, applicability, or configuration of the disclosure in any way. Rather, the foregoing detailed description will provide those skilled in the art with a convenient road map for implementing an exemplary collapsible map pocket of the disclosure. It is understood that various changes may be made in the function and arrangement of elements described in an exemplary collapsible map pocket without departing from the scope of the disclosure as set forth in the appended claims.

What is claimed is:

1. A map pocket usable as a trim component for a vehicle door assembly, the map pocket comprising:
   an inward-facing, substrate material layer comprising a polyethylene/polypropylene fibrous, thermoformed material, wherein the fibrous, thermoformed material comprises two material-types of fibers, polyethylene fibers and polypropylene fibers, that are neither woven nor knitted, but that are blended and laid into a matted form with the fibers randomly oriented in the mat; and an outward-facing, A-side material layer comprising a non-woven, thermoformed material, disposed abuttingly against the substrate material layer.

2. The map pocket of claim 1, wherein the map pocket has a shape and configuration that includes at least one substantially horizontal surface and at least one substantially vertical surface.

3. The map pocket of claim 2, wherein the map pocket has a shape and configuration that includes at least one open end, and wherein objects are storable within the at least one open end against the at least one substantially horizontal surface and the at least one vertical surface.

4. The map pocket of claim 3, further comprising a flange disposed about the at least one open end.

5. The map pocket of claim 4, wherein the flange comprises a plurality of attachment point apertures for receiving a fastener.

6. The map pocket of claim 1, wherein the A-side material layer comprises a Troubador material.

7. The map pocket of claim 1, wherein the substrate material layer has a density of from about 500 grams per square meter to about 2000 grams per square meter.

8. The map pocket of claim 1, wherein the substrate material layer has a thickness of about 3 to about 15 millimeters.

9. The map pocket of claim 1, wherein the A-side material layer has a thickness of about 0.5 to about 5 millimeters.

10. The map pocket of claim 1, wherein the substrate material layer excludes cut-out void portions, wherein a cut-out void portion is defined as a void within the periphery of the substrate layer that exceeds 5% of the total surface area of the substrate layer.

11. The map pocket of claim 1, wherein the substrate material layer and the A-side material layer comprise a unitary, bi-layer, thermoformed structure.

12. The map pocket of claim 1, wherein a ratio of polyethylene fibers to polypropylene fibers in the substrate material layer is from about 80:20 to about 20:80.

13. A vehicle comprising:
at least one door assembly, wherein the at least one door assembly comprises a plurality of trim components, wherein at least one of the plurality of trim components comprises a map pocket, and wherein the map pocket comprises:
an inward-facing, substrate material layer comprising a polyethylene/polypropylene fibrous, thermoformed material, wherein the fibrous, thermoformed material comprises two material-types of fibers, polyethylene fibers and polypropylene fibers, that are neither woven nor knitted, but that are blended and laid into a matted form with the fibers randomly oriented in the mat; and
an outward-facing, A-side material layer comprising a non-woven, thermoformed material, disposed abuttingly against the substrate material layer.

14. The vehicle of claim 13, wherein the substrate material layer is disposed against the at least one door assembly and wherein the A-side material layer faces an interior portion of the vehicle.

15. The vehicle of claim 13, wherein the map pocket is collapsible and serves as a barrier for protecting passengers of the vehicle against the forces of a side-impact collision.

16. The vehicle of claim 15, wherein the substrate material layer is tunable to provide the vehicle with varying levels of side impact protection without any change to the shape or configuration of the map pocket.

17. A method for manufacturing a map pocket usable as a trim component for a vehicle, the method comprising the steps of:
providing or obtaining a substrate material layer comprising a polyethylene/polypropylene fibrous, thermoformable material, wherein the fibrous, thermoformed material comprises two material-types of fibers, polyethylene fibers and polypropylene fibers, that are neither woven nor knitted, but that are blended and laid into a matted form with the fibers randomly oriented in the mat;
providing or obtaining an A-side material layer comprising a non-woven, thermoformable material; and
disposing the substrate material layer adjacent to the A-side material layer in a thermoforming mold with adhesive between the A-side material layer and the substrate material layer, and thermoforming the substrate material layer with the A-side material layer to form the map pocket as a unitary, bi-layer structure.

18. The method of claim 17, further comprising, subsequent to the step of thermoforming, performing post-processing steps comprising trimming the map pocket or forming attachment points in the map pocket.

19. The method of claim 17, further comprising, subsequent to the step of thermoforming, attaching the map pocket to a vehicle door as a trim component of the vehicle door.

20. The method of claim 17, wherein a ratio of polyethylene fibers to polypropylene fibers in the substrate material layer is from about 80:20 to about 20:80.

* * * * *